(12) United States Patent
Das Sharma

(10) Patent No.: US 12,259,835 B2
(45) Date of Patent: Mar. 25, 2025

(54) DISAGGREGATION OF COMPUTING DEVICES USING ENHANCED RETIMERS WITH CIRCUIT SWITCHING

(71) Applicant: Intel Corporation, Santa Clara, CA (US)

(72) Inventor: Debendra Das Sharma, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 525 days.

(21) Appl. No.: 17/353,416

(22) Filed: Jun. 21, 2021

(65) Prior Publication Data

US 2021/0311895 A1    Oct. 7, 2021

Related U.S. Application Data

(60) Provisional application No. 63/114,443, filed on Nov. 16, 2020.

(51) Int. Cl.
| G06F 13/364 | (2006.01) |
| G06F 13/362 | (2006.01) |
| G06F 13/40  | (2006.01) |
| G06F 13/42  | (2006.01) |

(52) U.S. Cl.
CPC ........ *G06F 13/364* (2013.01); *G06F 13/3625* (2013.01); *G06F 13/4081* (2013.01); *G06F 13/4221* (2013.01)

(58) Field of Classification Search
CPC ............... G06F 13/364; G06F 13/3625; G06F 13/4081; G06F 13/4221
See application file for complete search history.

(56) References Cited

U.S. PATENT DOCUMENTS

| 8,223,901 B2* | 7/2012 | Huttunen | H04L 27/2647 375/350 |
| 8,250,251 B2* | 8/2012 | Malalur | H04L 47/2441 710/22 |
| 8,856,399 B2* | 10/2014 | Haramaty | H04Q 11/0067 710/33 |
| 9,032,101 B1* | 5/2015 | Cox | G06F 12/0292 710/3 |
| 9,337,993 B1* | 5/2016 | Lugthart | H04L 7/0037 |
| 9,736,071 B2* | 8/2017 | Ajanovic | G06F 13/4252 |
| 9,766,833 B2* | 9/2017 | Nakajima | G06F 3/0637 |
| 9,965,439 B2 | 5/2018 | Sharma | |

(Continued)

FOREIGN PATENT DOCUMENTS

| CN | 210129218 U | 3/2020 |
| WO | 2017131741 A1 | 8/2017 |

OTHER PUBLICATIONS

PCT International Search Report and Written Opinion issued in PCT/US2021/051324, dated Jan. 11, 2022; 9 pages.

(Continued)

*Primary Examiner* — Henry Tsai
*Assistant Examiner* — Aurangzeb Hassan
(74) *Attorney, Agent, or Firm* — Alliance IP, LLC

(57) ABSTRACT

An apparatus may comprise multiplexing circuitry to select an ingress lane from among a plurality of ingress lanes to couple to an egress lane; and retiming circuitry to retime a signal received on the selected ingress lane and transmit the retimed signal on the egress lane.

20 Claims, 11 Drawing Sheets

(56) References Cited

U.S. PATENT DOCUMENTS

| | | | |
|---|---|---|---|
| 10,277,636 B2* | 4/2019 | Levy | H04L 65/70 |
| 10,606,793 B2 | 3/2020 | Sharma | |
| 10,877,761 B1* | 12/2020 | Xu | G06F 9/321 |
| 10,880,137 B2 | 12/2020 | Sharma | |
| 10,915,479 B1* | 2/2021 | Levi | G06F 13/28 |
| 11,424,905 B1* | 8/2022 | Musoll | H04L 25/03885 |
| 11,481,350 B1* | 10/2022 | Gangam | G06F 13/4282 |
| 2004/0258411 A1* | 12/2004 | Al-Salameh | H04J 14/0219 398/83 |
| 2008/0181112 A1* | 7/2008 | Beck | H04J 3/0632 370/235 |
| 2012/0005392 A1 | 1/2012 | Yagi | |
| 2015/0058518 A1 | 2/2015 | Kleineberg et al. | |
| 2017/0208377 A1* | 7/2017 | Rajan | H04J 14/083 |
| 2019/0012286 A1 | 1/2019 | Benedict et al. | |
| 2019/0065272 A1 | 2/2019 | Rao et al. | |
| 2019/0258600 A1 | 8/2019 | Sharma | |
| 2019/0384733 A1 | 12/2019 | Jen et al. | |
| 2020/0244561 A1 | 7/2020 | Riani et al. | |
| 2020/0250114 A1 | 8/2020 | Leung et al. | |
| 2021/0119730 A1* | 4/2021 | Das Sharma | H04L 1/0057 |
| 2021/0311895 A1 | 10/2021 | Sharma | |

OTHER PUBLICATIONS

French Patent Office; Office Action issued in FR Patent Application No. 2112006, dated Jan. 19, 2022; 4 pages including English translation.

French Patent Office Preliminary Search Report issued in FR Application Serial No. 2208982 mailed on Apr. 24, 2023, 16 pages, including English translation.

French Office Action received in Application No. 2112006, dated Jul. 20, 2023, with English translation, 14 pages.

Netherlands Patent Office; Search Report issued in Patent Application No. NL 2029396, dated May 18, 2022; 7 pages including partial English translation.

* cited by examiner

DISAGGREGATION OF COMPUTING DEVICES USING ENHANCED RETIMERS WITH CIRCUIT SWITCHING

RELATED APPLICATION

This application claims benefit under 35 U.S.C. § 119(e) of U.S. Provisional Application Ser. No. 63/114,443, entitled "DISAGGREGATION OF MEMORY AND I/O RESOURCES USING SMART RETIMERS WITH CIRCUIT SWITCHING" filed Nov. 16, 2020.

FIELD

The present disclosure relates in general to the field of computer development, and more specifically, disaggregation of computing devices using enhanced retimers with circuit switching.

BACKGROUND

Host, memory, and I/O disaggregation across multiple servers is a way of building systems to deliver high performance in a cost-effective and power-efficient manner.

BRIEF DESCRIPTION OF THE DRAWINGS

Like reference numbers and designations in the various drawings indicate like elements.

DETAILED DESCRIPTION

Figure 1:
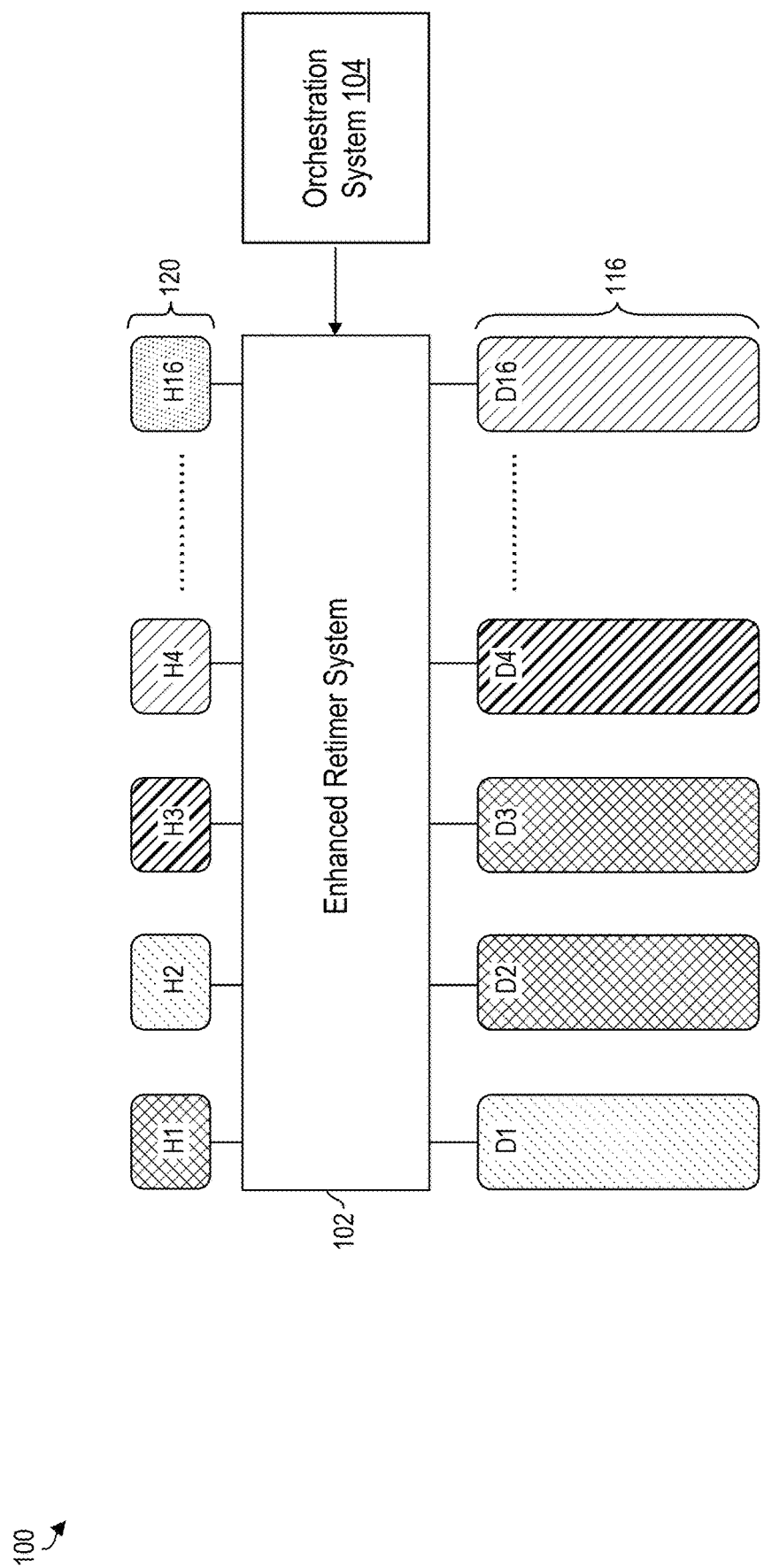
FIG. 1 is a block diagram of a computing system for disaggregation of computing devices using enhanced retimers with circuit switching in accordance with various embodiments.

FIG. 1 is a block diagram of a computing system 100 for disaggregation of computing devices using enhanced retimers with circuit switching in accordance with various embodiments. The computing system 100 includes various computing devices, including computing hosts 120 (e.g., H1-H16) and devices 116 (e.g., D1-D16) selectively coupled together through an enhanced retimer system 102 comprising a plurality of enhanced retimers. The computing system 100 also includes an orchestration system 104 to set connectivity of the computing devices through the enhanced retimers and to otherwise facilitate the operation of the enhanced retimers and the links they support.

One of the important usages in data centers today is the pooling of resources across several hosts. This enables the same device (e.g., I/O device, accelerator, memory drive, graphics processor unit, etc.) to be assigned to different hosts at different times, depending on the workload. For example, if a server needs two field programmable gate arrays (FPGAs) and a general-purpose graphics processing unit (GPGPU), it can ask for those resources from a resource manager (e.g., orchestration system 104) in the rack and obtain these resources if they are available and may then relinquish these resources when the workload is completed. Similarly, memory can be flexibly allocated and deallocated to different hosts depending on the need. This enables system designers to avoid overprovisioning every host (e.g., server in a rack) while preserving high performance. The benefits of resource pooling include minimization of stranded and unused resources in the platform, resulting in performance benefits, power efficiencies, denser compute, and a reduction in total cost of ownership.

As illustrated in FIG. 1, a set of devices 116 (e.g., memory, accelerators, I/O devices) may be kept in a pool that is shared across multiple computing hosts 120 (e.g., servers in a rack). The devices 116 may be migrated between hosts using managed hot-plug flows. One or more devices 116 may be assigned to a host 120. A device 116 can be hot-removed from a host 120 if the host does not need the device anymore. The device 116 then goes back into the pool and is reassigned to a different (or same) host 120 later depending on the demand. In some embodiments, partial allocations of a device 116 (e.g., a memory drive) may be made to different hosts 120, and such allocations can change over time with hot-plug flows.

Connectivity may be implemented between hosts and devices in various manners, such as through switches or direct connectivity, but such systems may have one or more drawbacks, such as the inability to assign portions of a device simultaneously to multiple hosts, fixed width allocations, the inability to access the full bandwidth of a device, increased latency, or higher costs and power.

In various embodiments of the present disclosure, computing system 100 may provide connectivity between computing devices (e.g., host to host, device to device, and host to device connectivity) using enhanced retimer system 102. Various embodiments may utilize enhanced bit-sliced retimers to provide link partitioning (including dynamic link partitioning), multiple layers of retimers to allow more connectivity permutations, retimer rules to enable disaggregation, or skew adjustment for better platform flexibility. At least some of these embodiments may provide technical advantages, such as more effective bandwidth utilization, lower cost, lower power, or lower latency communications.

An enhanced retimer of the system 102 may have the ability to recover data received over a lane from a source, extract an embedded clock within the data, and then retransmit the data towards a destination using a clean clock. A retimer may be used as a channel extension device to extend the channel reach.

Enhanced retimer system 102 may be coupled to each computing device (116 or 120) via a connection having any suitable width, where the width may be defined in terms of lanes. In some embodiments, each lane may comprise a transmit path and a receive path (with each path comprising a unidirectional differential pair). In various examples, a computing device may have an x16 (16 lanes), x8, (8 lanes), or x4 (4 lanes) connection to the enhanced retimer system 102.

A computing device may connect to another device across a link, which may refer to a logical connection between computing devices and may also be defined in terms of number of lanes. A link may comprise sub-links (e.g., a sub-link from a host to a retimer and another sub-link from the retimer to the device). In some embodiments, a connection may comprise portions of multiple links (e.g., when a x16 connection is partitioned to support smaller links).

The enhanced retimer system 102 may facilitate links of any suitable protocols, such as Peripheral Component Interconnect Express (PCIe) (e.g., as defined in the PCIe 5.0 base specification or other suitable PCIe specification), Compute Express Link™ (CXL) (e.g., as defined in the CXL 2.0 Specification or other suitable CXL specification), or other suitable signaling protocol.

In the embodiment depicted, H2 may connect to D1 using a x16 link through the retimer system 102. Similarly, H3 may connect to D4 and H4 may connect to D16 using respective x16 links. H1 may connect to D2 and D3 using two x8 links, even though D2 and D3 may be x16 capable, since H1 may have a partitionable x16 connection to the retimer system 102.

A computing device (e.g., host 120 or device 116) may comprise any electronic device capable of performing computing operations (e.g., processing or storage operations) and communicating over a link. A host 120 may comprise a computing device that may utilize another device 116 for processing or storage operations. In various embodiments, a computing device may comprise a central processing unit. In some embodiments, a computing device may also comprise supporting architecture, such as BIOS, memory, or I/O services. In some embodiments, a host 120 may comprise a server. A device 116 may comprise any suitable processing or storage device, such as a hardware accelerator, memory drive, pool of memory drives, GPU, field programmable gate array, neural network processing unit, artificial intelligence processing unit, inference engine, data processing unit, or infrastructure processing unit, or I/O device, among others).

Orchestration system 104 may comprise any suitable computing system. Orchestration system 104 may generally be independent of the hosts 120, though in some embodiments, a host 120 may be used to implement the orchestration system 104. Orchestration system 104 may orchestrate the resource assignment to different hosts 120 and devices 116 by invoking hot-plug flows and configuring connectivity in multiplexers of the retimers of the enhanced retimer system.

Figure 2:
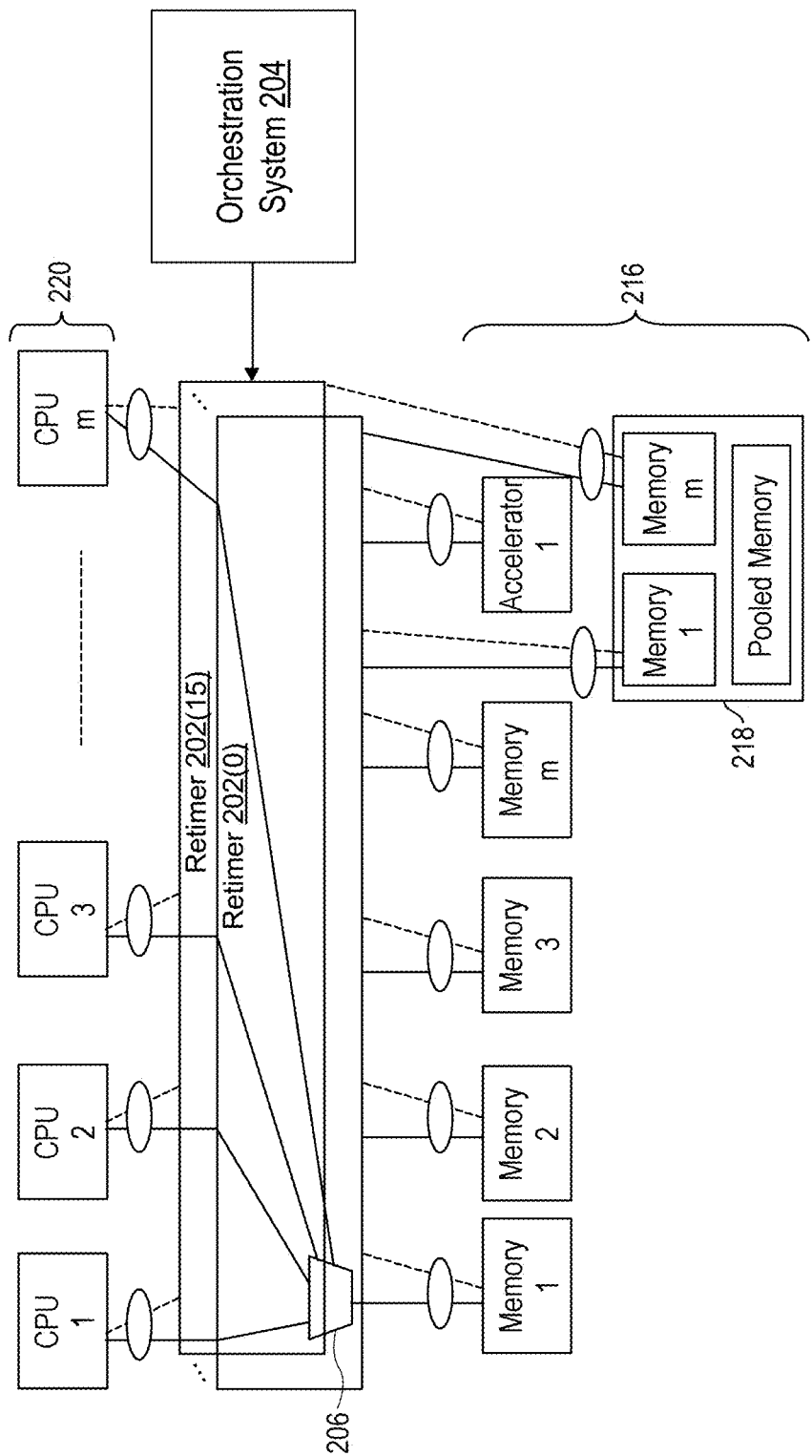
FIG. 2 is a block diagram that shows bit sliced retimers enabling disaggregation of computing devices in accordance with various embodiments.

FIG. 2 is a block diagram that shows enhanced retimers 202(0)-202(15) enabling disaggregation of computing devices comprising hosts 220 (shown as CPUs 1-m) and devices 216 (including various memories and an accelerator) in accordance with various embodiments. The retimers 202 may represent one embodiment of enhanced retimer system 102.

In this embodiment, each retimer 202 has 16 ingress lanes for coupling to hosts 220 and 16 egress lanes for coupling to devices 216 (though other retimers used in enhanced retimer system 102 may include any suitable number of ingress and egress lanes). In this example, each similarly numbered lane of the hosts 220 and devices 216 are coupled to the particular retimer 202 having that number as a suffix in FIG. 2. Thus, lane 0 of each host 220 and each device 216 is coupled to retimer 202(0), lane 1 of each host 220 and each device 216 is coupled to retimer 202(1), and so on. Thus, each retimer 202 couples to a single lane of each of the hosts 220 and devices 216.

For hosts or devices that have a lane width that is narrower than the number of retimers, the lanes may be connected to any suitable set of retimers 202. For example, a x8 computing device (e.g. a computing device that has an 8 lane connection to the retimer system 102) may connect its lanes either to retimers 202(0)-202(7) or to retimers 202(8)-202(15). As another example, a x4 computing device may connect its lanes to retimers 202(0)-202(3), 202(4)-202(7), 202(8)-202(11), or 202(12)-202(15).

Multi-headed devices such as the pooled memory device 218 may connect to either the same set of retimers 202 (e.g., both memory 1 and memory m of pooled memory device 218 may connect to retimers 202(0)-202(7)) or to different sets of retimers 202 (e.g., memory 1 may connect to retimers 202(0)-202(7) and memory m may connect to retimers 202(8)-202(15)).

Each retimer 202 may include a multiplexer system that can select which ingress lane of the retimer 202 will be connected to each egress lane of the retimer 202. In a standard 16-lane retimer, the ingress lane i (where 0<=i<=15) is connected to the same lane i of the egress lanes. However, in enhanced retimers 202, the multiplexer system may include various 16:1 multiplexers (e.g., 206) that accepts the 16 ingress lanes as input and couples one of these ingress lanes to an egress lane. Similar multiplexers may be present for each egress lane. In this manner, any one of the ingress lanes may be connected to any one of the egress lanes, and thus a retimer 202 may provide a lane of connectivity between any of hosts 220 and any of devices 216. By configuring multiple multiplexers of various retimers 202, multiple lanes may be connected from one of the hosts 220 to one of the devices 216 (since the lanes of each computing device pass through multiple different retimers 202). For example, a particular host 220 may connect to a particular device 216 through 4 retimers 202 to a particular device to form a x4 link, through 8 retimers 202 to form a x8 link, or through 16 retimers 202 to form a x16 link.

As a lane includes both a transmit path and a receive path, a multiplexer 206 that couples an ingress lane to an egress lane may include multiplexer circuits including a set of multiplexers that each receive all of the receive paths (from the point of view of the retimer 202) of the ingress lanes as inputs and selects one of the inputs to couple to a respective transmit path of the egress lanes as well as a set of multiplexers that each receive all of the receive paths of the egress lanes as inputs and selects one of the inputs to couple to a respective transmit path of the ingress lanes.

Thus, the multiplexer systems of the retimers 202 selects which hosts 220 connects to which devices 216. The multiplexer settings of the various retimers 202(0)-202(15) are selected by the orchestration system 204 (which may, e.g., implement a sideband system management) that orchestrates the resource assignment to different hosts by invoking the relevant hot-plug flows.

In various embodiments, each retimer 202 may be included on its own semiconductor chip. In other embodiments, multiple retimers 202 could be included on a single semiconductor chip. In some embodiments, an enhanced retimer system 102 may be included on a semiconductor package, which may include one or more semiconductor chips including the retimers of the system 102.

Although this disclosure focuses on host to device connectivity, it also contemplates host to host and device to device connectivity. For example, the multiplexer 206 may be expanded so that it may couple a lane from any host 220 to a lane to any other host 220 or device 216. Similarly, the multiplexer may couple a lane from any device 216 to any other device 216 or host 220. Any disclosure herein regarding connectivity between hosts and devices may also apply to host to host connectivity or device to device connectivity.

Equalization may be performed on each lane in a link to ensure that each receiver can provide the proper transmitter set up during the equalization phases of link training for reliable operation of the link as long as the link is "up" (e.g., including any low-power and active state transitions).

In some embodiments, when the configuration of the connectivity changes (e.g., during a hot swap), equalization does not need to be performed by the retimers 202 (or the computing devices) because the links do not physically change, only the multiplexer settings change. Hence during these hot-plug flows, equalization can be completely bypassed, if supported by the device, since the link does not change. In various embodiments, the retimers 202 support the "no equalization" mechanism defined in Peripheral Component Interconnect Express (PCIe) 5.0 base specification. In some embodiments, the equalization settings (e.g., cursor coefficients to determine the level of de-emphasis and preshoot, receiver equalization coefficients for receive-side equalization in the form of continuous time linear equalization (CTLE) and decision feedback equalization (DFE)) used by the retimer 202 to receive from and transmit to each host 220 and to receive from and transmit to each device 216 may be determined beforehand and stored by the retimers 202 (or by orchestration system 204) and then reused by the retimers 202 on the active links.

Figure 3:
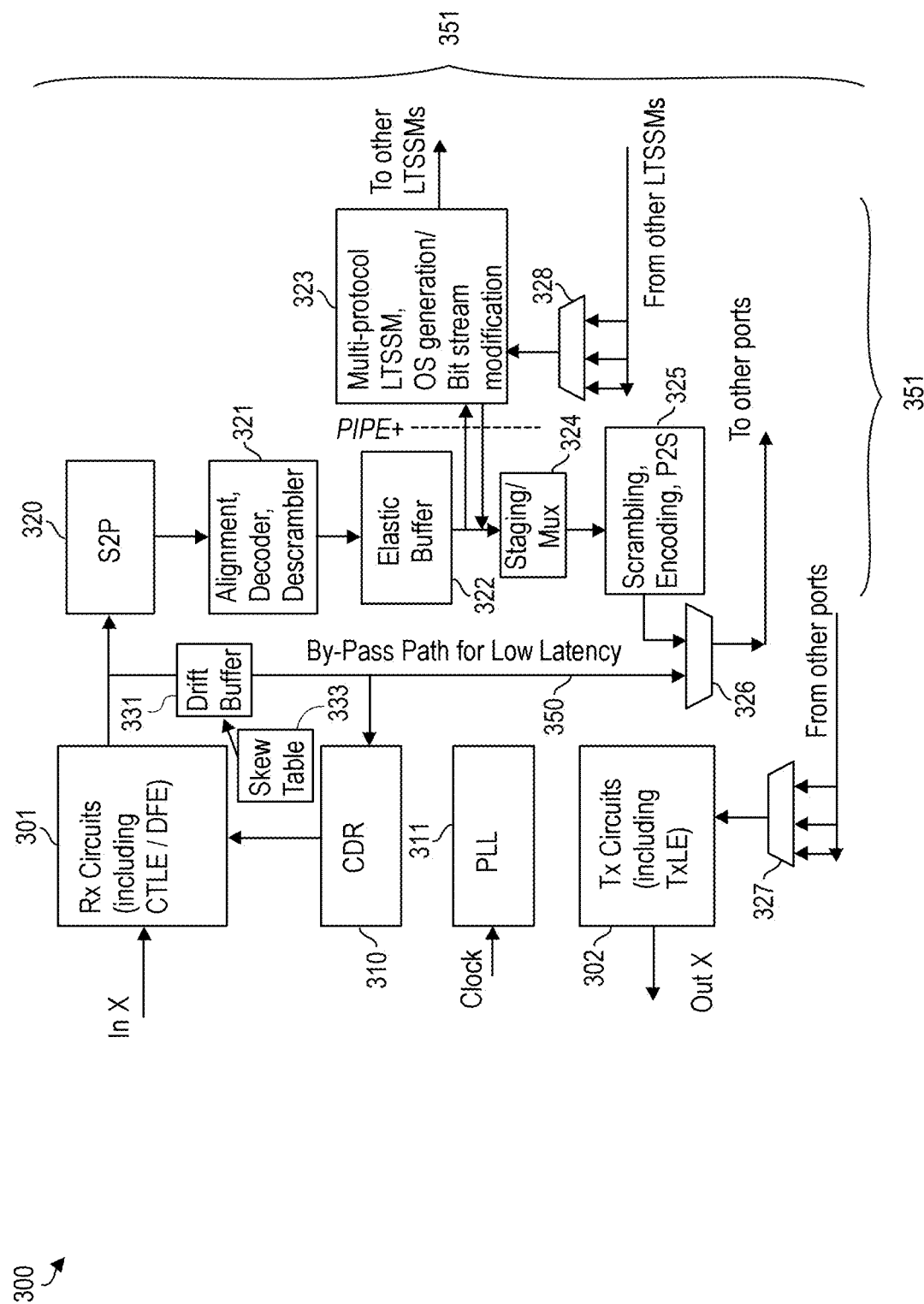
FIG. 3 is a block diagram of an architecture of a port of an enhanced retimer in accordance with various embodiments.

FIG. 3 is a block diagram of an architecture of a port 300 of an enhanced retimer (e.g., 202) in accordance with various embodiments. In various embodiments, the port may be replicated for each receive path coupled to the retimer (e.g., on each of the ingress and egress lanes). In various embodiments, the retimer may be capable of retiming signals of various different protocols or may be specially adapted to retime signals of a particular protocol.

The port 300 includes a receiver 301 (e.g., receive circuits) and a transmitter 302 (e.g., transmit circuits). In one embodiment, receiver 301 performs a continuous time linear equalization (CTLE) or decision feedback equalization (DFE) on a received signal. A clock and data recovery (CDR) circuit 310 is coupled to receiver 301 to recover an embedded clock in a received signal. A phase locked loop (PLL) or other clock generator 311 provides clock signals to the components of the retimer.

The retimer includes two data paths between receiver 301 and transmitter 302. Both are coupled to the output of receiver 301 and to two inputs of a mux 326, the output of which is sent to the other ports of the retimer (e.g., to a mux that is similar to mux 327). One of the data paths, data path 351 is for use during link training (e.g., an equalization process for generating transmitter and/or receiver equalization parameters (e.g., coefficients)), while the other data path, the bypass path 350, is used after link training.

Data path 351 includes a number of components. Serial to Parallel (S2P) converter 320 converts data from a serial format to a parallel format. As receiver 301 operates in the analog domain, S2P converter 320 converts the received data into parallel format so that the data may be processed in digital format.

Based on the protocol associated with the data, the parallel data undergoes alignment, decoding and descrambling by data processor 321 if necessary. More specifically, the data may need to be unscrambled. This may be due to the speed at which the data is being received. The bits may have to be decoded. For example, the data may have to undergo 8 b/10 b decoding or another type of decoding. The data bits may also have to undergo alignment to determine when symbols in the stream of bits begins. These options may be performed consistent with the various protocols supported by the retimer. If a protocol does not require any or all of alignment, decoding and descrambling, then such functions are not performed. The resultant data is stored in elastic buffer 322.

In one embodiment, elastic buffer 322 is a common elastic buffer that can also act as a drift buffer for protocols (such as, for example, Ultra Path Interconnect (UPI), Universal Serial Bus (USB), Thunderbolt, etc.) that need it. Elastic buffer 322 may also compensate for bit streams that are being transmitted according to clocks of one clock domain that don't match the clocks of the clock domain to which the data is being transmitted.

The data from the elastic buffer 322 is sent to the staging buffer and (mux) 324 and the multi-protocol training control block 323.

In one embodiment, multi-protocol training control block 323 includes a common set of link training and status state machine (LTSSM) subset needed for each protocol along with the associated bit stream detection/modification needed for each protocol. For example, if one of the protocols is PCIe, then the PCIe LTSSM is included as a subset in the common set, and the multi-protocol training control block 323 is able to perform bit stream detection, ordered set generation (that is used during link training), and bit stream modification that are associated with the PCIe Standard. In one embodiment, multi-protocol training control block 323 includes a common set of link training and status state machine (LTSSM) subset for one or more of USB, Display Port, Thunderbolt, or coherency protocols such as, for example, UPI.

Since (at least in some embodiments) each retimer receives the same lane i (where 0<=i<=15) from each host 220 and device 216, each retimer may have up to 16 independent retimer state machines (RTSMs) which are able to operate after identifying a 0 or non-0 lane number (e.g., the retimers do not need to check to ensure that different lane numbers go through different ports of the retimers as a standard retimer may do, but rather defers to the computing devices to negotiate the link numbers and lane numbers).

An RTSM may be a subset of the LTSSM and may dictate when the retimer needs to actively participate in the training process and when it simply forwards the bits as it receives them (e.g., with the exception of reporting its own parity periodically in the SKP Ordered Sets). The RTSM may help track the major LTSSM state transitions for the port to ensure the retimer is in sync with the link state.

As depicted, the LTSSM of block 323 may share information with other LTSSMs and receive data from a mux 328 that receives similar information from other LTSSMs of the retimer. Such information may include, e.g., equalization settings or indications of low-power state entry. If multiple lanes form one link, and one RTSM is maintained for all those links, a "localized" RTSM may provide controls on a per-lane basis and an aggregator may make sure that all associated RTSMs are acting in unison. In various embodiments, the selection of the mux 328 may mirror the selection of mux 327, such that data from the same port is passed through mux 327 and 328.

Any data output for transmission to another port (e.g., through a respective transmitter 302 of another port) from multi-protocol training control block 323 and data from elastic buffer 322 are received by inputs of the mux of staging buffer and mux 324, which outputs either signal depending on the control selection (e.g., signal) received by the mux 324.

Finally, data output from staging buffer and mux 324 undergoes any scrambling and encoding, as dictated by the protocol being used to transfer the data, and conversion to a serial format using converter 325. The serial data is output to one input of mux 326, which provides the serial data or the data from bypass path 350 to the other ports (e.g., all of the other ports or a subset thereof).

Thus, the data path 351 has a common set of processing blocks and the common circuitry above has a common set and associated control circuitry that can make the protocol and data rate related controls needed to operate to transfer data according to more than one protocol. In one embodiment, a strap or sideband signal is used by the data path to determine the PHY/protocol in use. Alternately, the logic layer can look for the initial training sets and determine which PHY protocol is being used. In one embodiment, this logic layer resides in multi-protocol training control block 323.

Bypass path 350 is the second data path for use after link training. In one embodiment, bypass path 350 is for low-latency bit transmission and is enabled for regular bit-stream transmission in a common clock mode.

In the embodiment depicted, the bypass path 350 includes drift buffer 331 coupled to skew table 333. In some embodiments, the drift buffer may help compensate for bit streams that are being transmitted according to clocks of one clock domain that don't match the clocks of the clock domain to which the data is being transmitted (and thus drift buffer 350 may account for clock drift). The drift buffer 331 may also allow for injection of delay into the bypass path 350 in order to account for different skews that may be present among the various lanes of a link. By combining the drift buffer 331 with skew correction capabilities, an additional buffer for just the skew correction may be avoided.

As the signals of each lane of a link may pass through a different port of a different retimer (each having a respective drift buffer 331), the skew adjustment may be performed at a per-lane granularity. As one example, if the H4 to D16 link in FIG. 1 has skew in a first lane (through a first retimer) that exceeds the skew in a second lane (through a second retimer) by a predetermined amount, then more skew may be injected into the bypass path 350 by the drift buffer 331 for the second lane on the H4 ingress going to D16 egress. In general, the injected skew may reduce the difference in skew between the lane with the least skew and the lane with the most skew on the link (or skew is not injected if the skew differences among the lanes are tolerable). In some embodiments, the drift buffer 331 may have at least a 0.5 ns granularity and at least 10 settings, thus the drift buffer may have the ability to add at least up to 5 ns of delay, although any suitable granularity and number of settings is contemplated herein.

Skew table 333 (which in some embodiments may be loaded by the orchestration system 104 or other system management software that is able to determine skew from various retimers) may indicate how much delay to introduce to the bypass path 350 (e.g., by controlling the drift buffer depth). Thus, each retimer may have its own skew table 333 with settings for each port 300. In one embodiment, the skew tables 333 of the various retimers may be preloaded with the settings for all possible connections. As one example, a 16-lane retimer may implement a 16×4 bit register for each ingress lane (with each 4 bit value representing the delay setting for a particular ingress to egress combination). As an alternative, the skew tables 333 may simply contain the settings for the current connection and could be dynamically updated (e.g., by the orchestration system 104 which may store the settings for the various possible connections) when the settings for the muxes (e.g., 327, 328) are updated to change connectivity through the retimers. The particular settings may be determined via testing or through other means (e.g., an analysis of the circuit layout of one or more components of the system).

In one embodiment, even in the bypass mode, the logic layer in the regular path 351 monitors the traffic to determine if a bit stream needs to be modified. In one embodiment, the following mechanisms are used to transition between path 351 and bypass path 350.

In one embodiment, during link training, path 351 participates in the Tx equalization mechanism on both sides, as dictated by the corresponding PHY protocol specification. The Tx equalization setting remains for that speed in place until there is a re-equalization procedure. Note that in one embodiment, a re-equalization procedure may occur when a component detects that the equalization it did previously is not working well as determined by the error rate. In another embodiment, the re-equalization procedure may occur when software directs a link to redo equalization based on similar metrics such as error rate being above a threshold.

In some embodiments, the various analog control circuitry, such as, for example, those of receiver 301 and transmitter 302, can operate in all the data rates of the supported protocols.

Figure 4A:
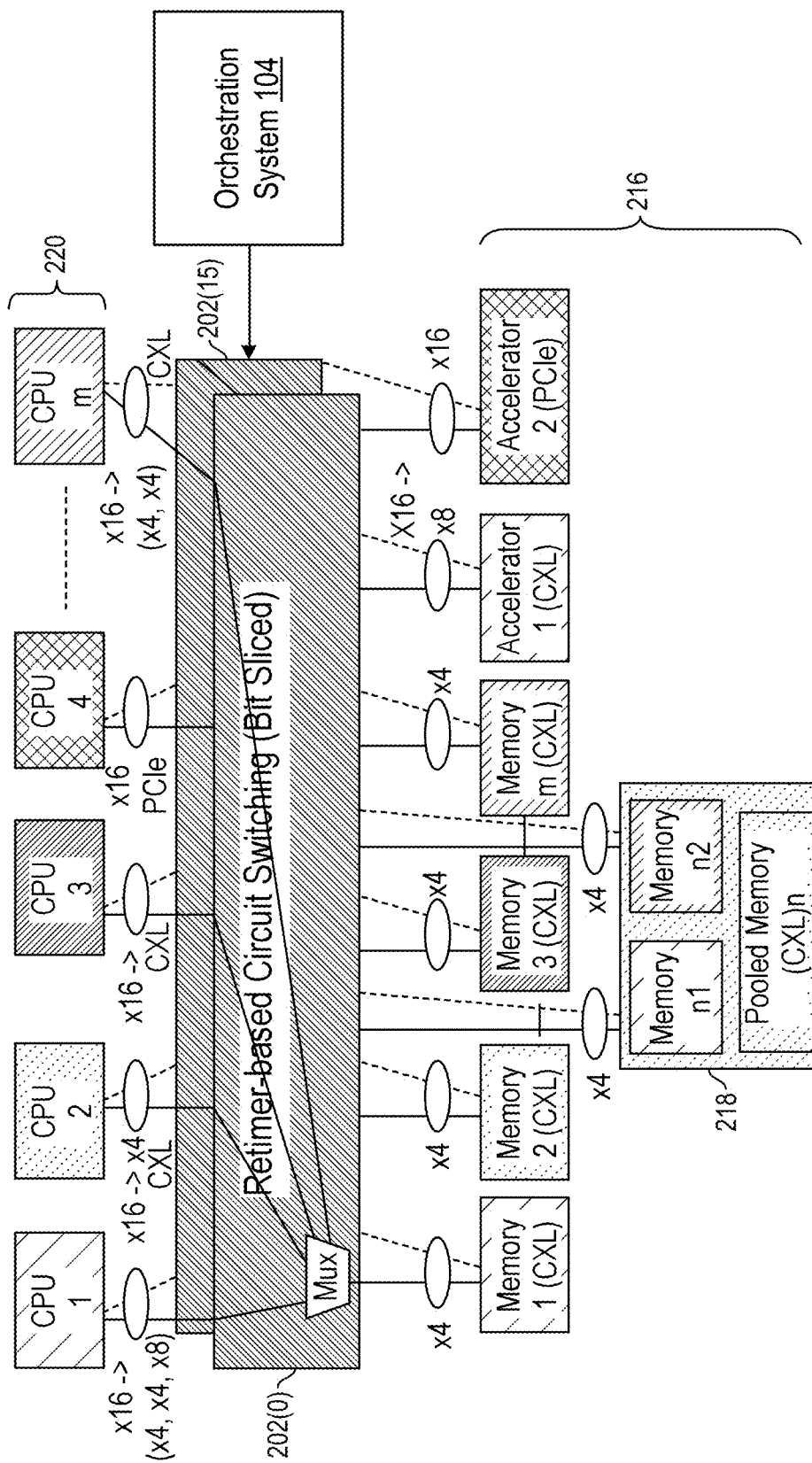
FIGS. 4A-4B illustrate dynamic resource allocation at a first time and at a second time in accordance with various embodiments.
Figure 4B:
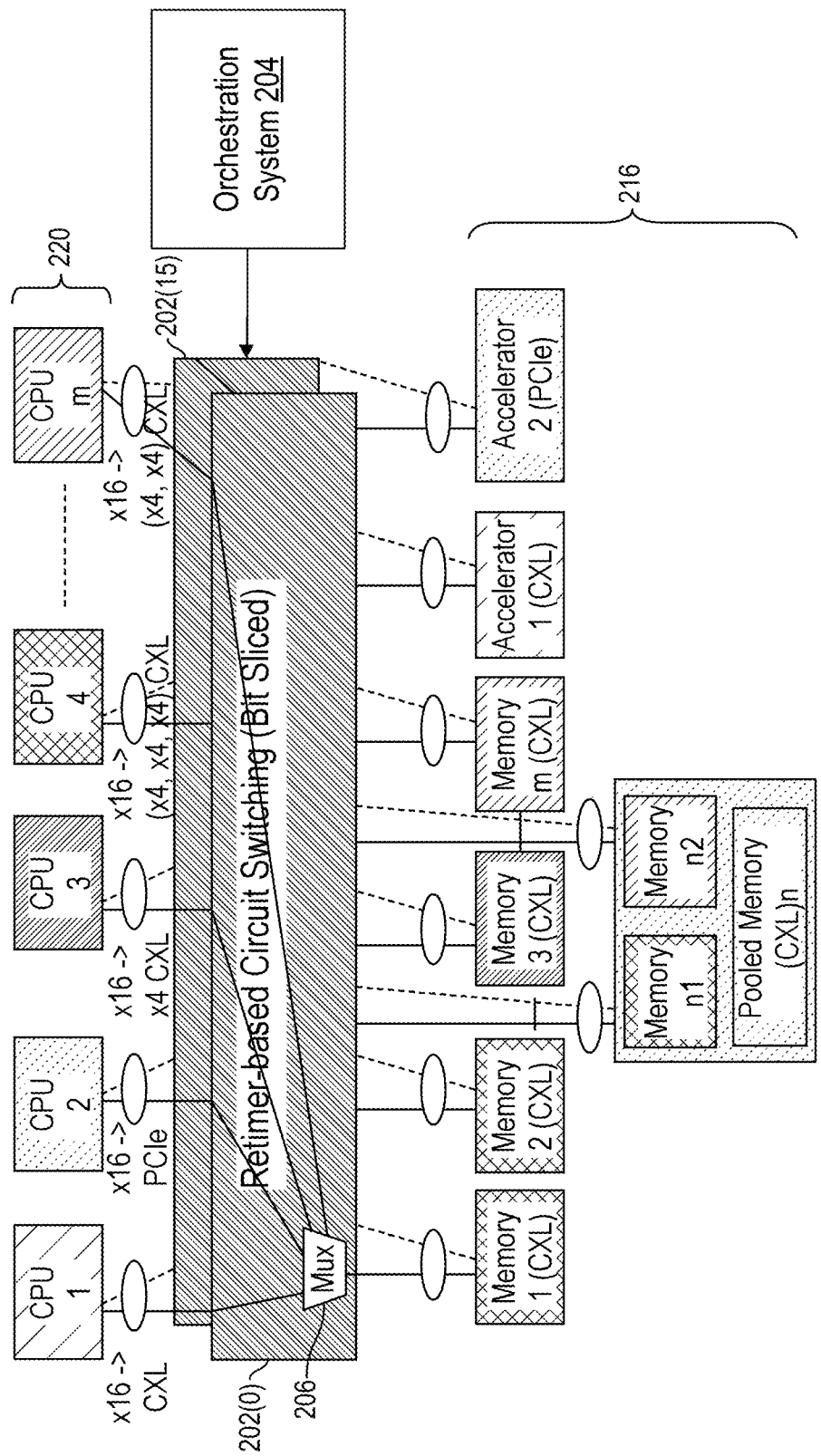

FIGS. 4A-4B show dynamic resource allocation through an enhanced retimer system at a first time and at a second time in accordance with various embodiments. Using the approaches described above, resources may be dynamically allocated, including the adjusting of link widths.

At a first point of time, the resources may be allocated as shown in FIG. 4A. In the embodiment depicted, CPU 1 is connected to Memory 1 (e.g., Type-3 CXL Memory) using a x4 link, a portion of pooled memory device 218 (e.g., a CXL memory device) using a x4 link, and Accelerator 1 using a x8 link (where only 8 of the 16 available lanes of the accelerator are used). Thus, the x16 connection between CPU 1 and the enhanced retimer system comprising retimers 202(0)-202(15) is partitioned across 3 different links. CPU 2 is connected to Memory 2 using a x4 link, CPU 3 is connected to Memory 3 using a x4 link, CPU 4 is connected to Accelerator 2 using a x16 link, and CPU m is connected to Memory m using a x4 link and a portion of pooled memory device 218 using a x4 link.

At a second point of time, the resources may be allocated as shown in FIG. 4B. As depicted, the connectivity has changed (e.g., through adjustment of the settings of the respective muxes of the retimers 202). As depicted in FIG. 4B, CPU 1 is now only connected to Accelerator 1 through an x16 link (instead of an x8 link). CPU 2 is now connected to Accelerator 2 using an x16 link, CPU3 is still connected to Memory 3 using a x4 link, CPU4 is now connected to Memory 1 using a x4 link, Memory 2 using a x4 link, and a portion of pooled memory device 218 using a x4 link, and CPU m is now connected to Memory m using a x4 link and a portion of pooled memory device 218 using a x4 link. As depicted, the links may be of different types (e.g., both CXL and PCIe links are depicted).

In various embodiments, when connectivity changes result in changes of link widths, the host or device may also make internal configuration changes. For example, the relevant computing device may have queues for data configured based on the link width(s) and may repartition the queues to accommodate the new link width(s). For example, a host may have a queue for an x16 link, and when the connections change to x4, x4, and x8, the host may reconfigure the queue into two queues that are each 14 the size of the original queue and a third queue that is 12 the size of the original queue. The computing devices may also quiesce the queue(s) that fed the old link(s) before reconfiguring the queue(s) and retraining on the new link(s).

Figure 5:
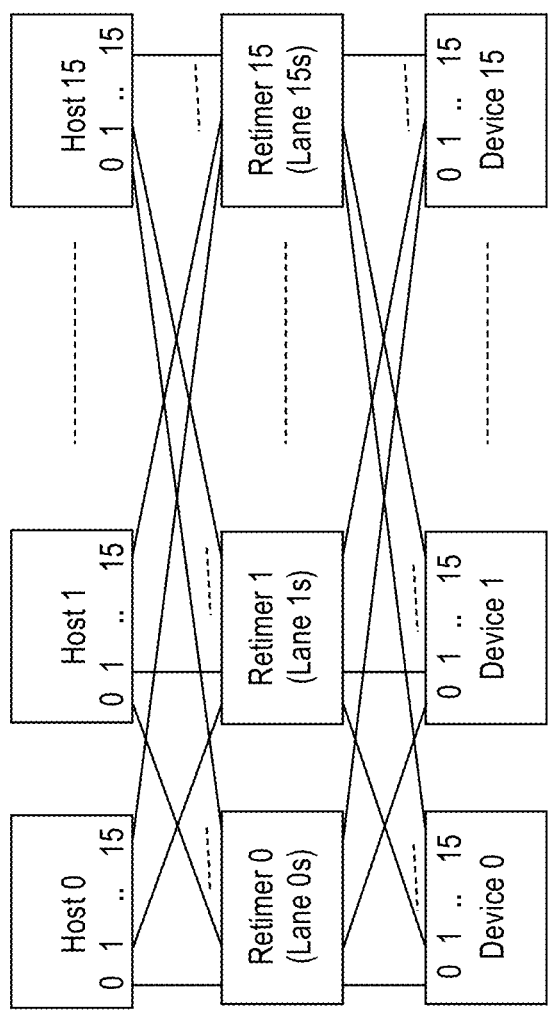
FIG. 5 is a block diagram of a plurality of retimers connecting 16 hosts to 16 devices in accordance with various embodiments.

FIG. 5 is a block diagram of 16×16 retimers (retimers having 16 ingress and 16 egress lanes) connecting 16 hosts to 16 devices in accordance with various embodiments. In this embodiment, all the links are the same width (x16) and use the same number of retimers as the link width (as one lane of a link passes through each retimer). In this approach, any device can be connected to any host (as long as a host only connects to one device and vice versa) where each lane for such a connection goes through a respective retimer. For example, lane 0 of any link would pass through retimer 0, lane 1 of any link would pass through retimer 1, and so on.

Figure 6:
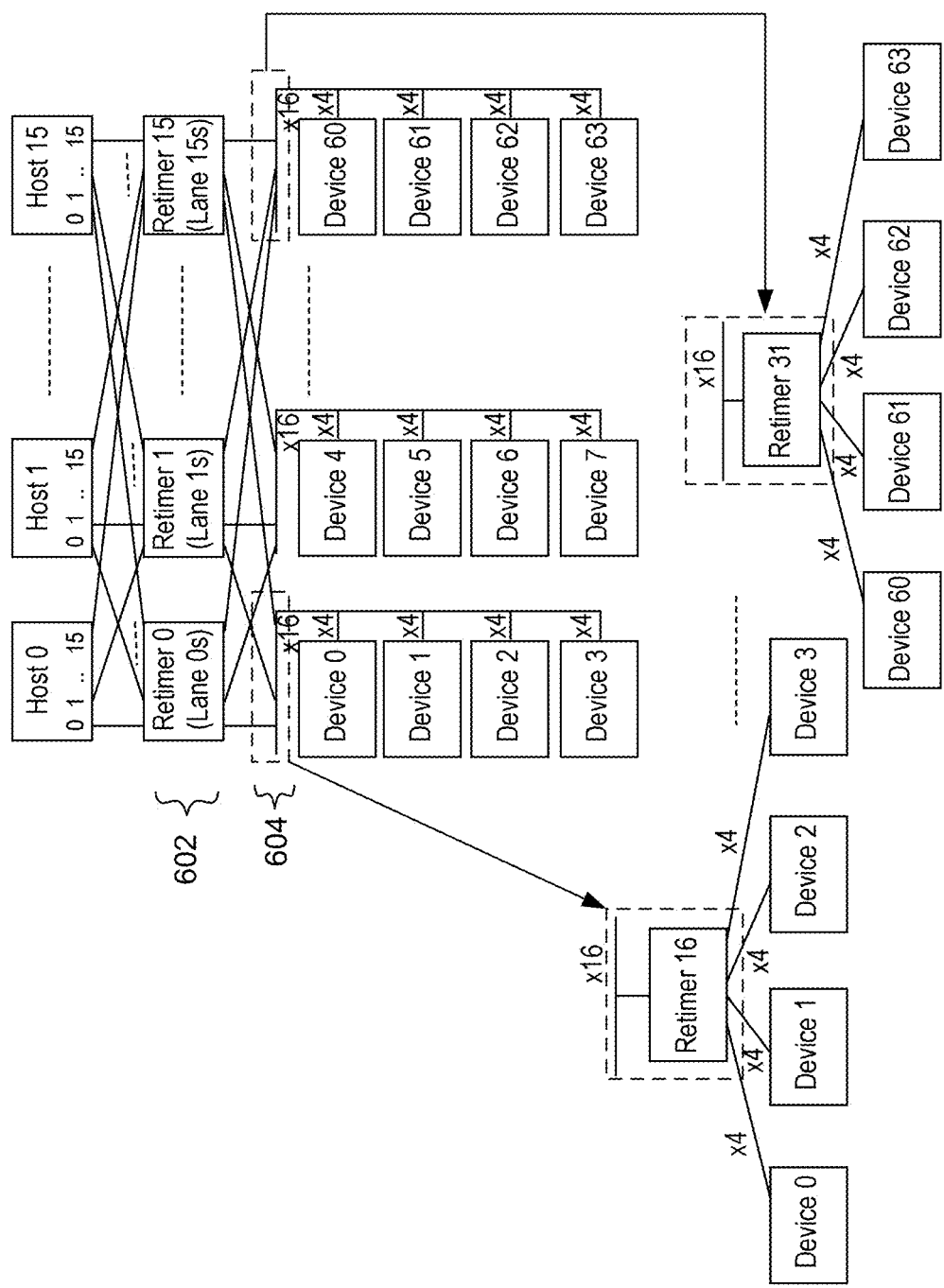
FIG. 6 is a block diagram of a multi-level retimer architecture in accordance with various embodiments.

FIG. 6 is a block diagram of a multi-level retimer architecture in accordance with various embodiments. In this embodiment, each host has a x16 connection which may be partitionable into up to 4 different x4 links to other computing devices through multiple levels of retimers. If only one level 602 of retimers (e.g., retimers 0 through 15) is used (as in FIG. 5), a fair amount of connectivity is achievable, but some connectivity permutations are not possible. For example, host 0 cannot connect to device 0 and device 4 using two x4 links simultaneously since both devices use lanes 0-3 coming from retimers 0-3.

A second level 604 of retimers may provide additional connectivity permutations relative to a single level of retimers. In the embodiment depicted, in the second level 604 of retimers, the routing between the retimers and the devices is done on x4 granularity (where all 4 of the lanes of a device are coupled to the same retimer of the second layer). This is in contrast to the routing between hosts and the first level of retimers which are on a x1 granularity (wherein only one lane from each host is coupled to a particular retimer) or the routing between the first level of retimers and the second level of retimers, which is also on a x1 granularity (where only one lane from each retimer of the first layer is coupled to a particular retimer of the second level). In the x4 granularity scheme, lanes 0-3, 4-7, 8-11, and 12-15 will each be routed as a group since most of the multiplexing is done at the first level of retimers.

In this embodiment, host 0 can connect to device 0 using retimers 0-3 of the first level 602 and retimer 16 of the second level 604. Host 0 may also simultaneously connect to device 4 using retimers 4-7 (not shown) which will place the connections to lanes 4-7 but retimer 17 (not shown, but is coupled to devices 4-7) can redirect those to lanes 0-3 (which are the lanes used by device 4 to couple to retimer 17) through the appropriate mux configuration.

Although each device in FIG. 6 is depicted as having x4 links to a respective retimer of the second level 604, a device could instead have x8 or x16 links to a retimer of the second level. For example, device 0 and device 1 could alternatively be a single device with an x8 link to retimer 16 and devices 60-63 could alternatively be a single device with an x16 link to retimer 31. Thus, any combination of x4, x8, or x16 devices may be used in this scheme. For the x16 devices, the corresponding second level retimer could be removed or may simply have fixed connections to the lanes of the x16 device.

Figure 7:
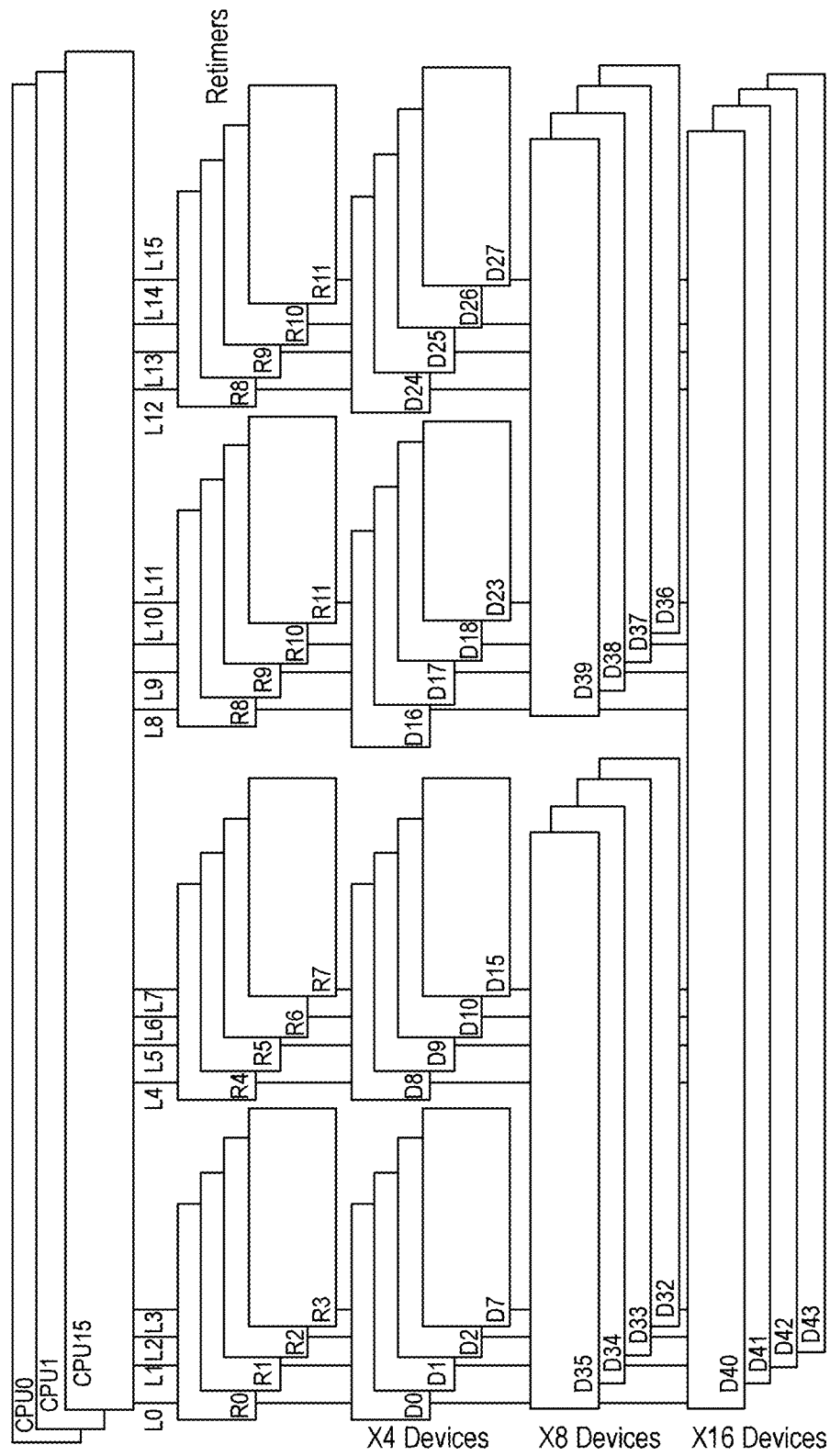
FIG. 7 is a block diagram of hosts with partionable links, a hierarchy of enhanced retimers, and computing devices with variable width links in accordance with various embodiments.

FIG. 7 is a block diagram of hosts with partionable links, a hierarchy of enhanced retimers, and computing devices with variable width links in accordance with various embodiments. Various embodiments may allow for a mix-and-match of different numbers of x16, x8, and x4 devices as depicted. The embodiment depicted shows 16 host(s) each with a x16 connection partitionable as 4×4s, connected to 4×16, 8×8, and 16×4 PCIe/CXL devices through a hierarchy of retimers.

Figure 8:
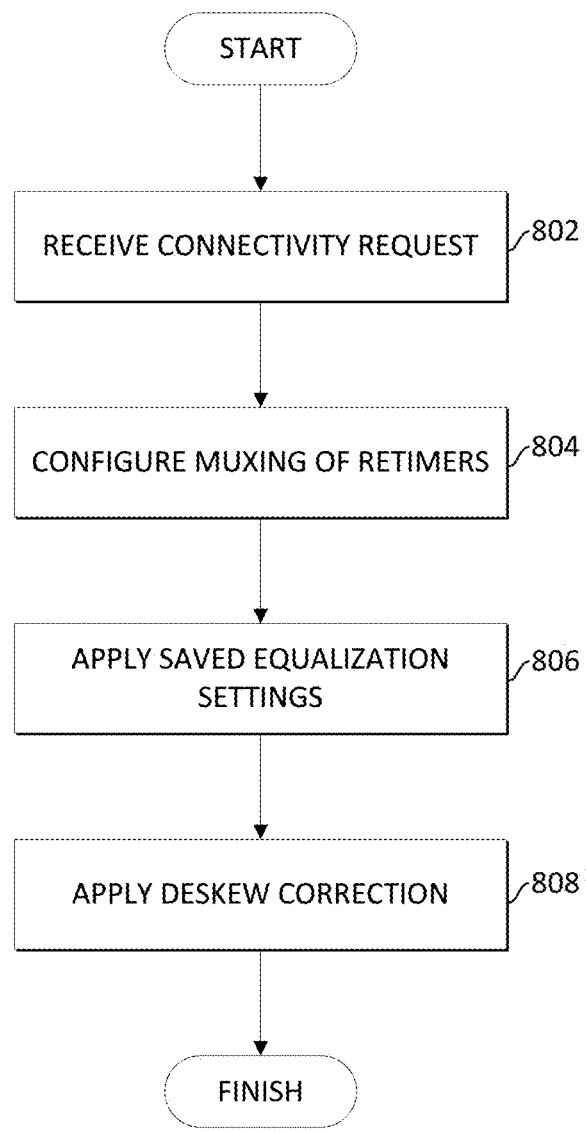
FIG. 8 is a flow for disaggregation of computing devices using enhanced retimers with circuit switching in accordance with various embodiments.

FIG. 8 is a flow for disaggregation of computing devices using enhanced retimers with circuit switching in accordance with various embodiments. At 802, a connectivity request is received (e.g., by orchestration system 104). For example, a host or a device may request a connection to another host or device (or may send a request for resources and the host or device may be selected to provide those resources). If the requested host or device is available, muxing of various retimers is configured at 804. This may involve the orchestration system 104 sending a communication to various retimers directing the reconfiguration of one or more muxes of each retimer. At 806, saved equalization settings are applied by the retimers for the sub-links of the newly formed link. At 808, deskew correction is applied for the link (e.g., by applying delay values stored in skew table 333). Data may then be communicated over the link by the respective computing devices.

The flows described in the FIGS. herein are merely representative of operations that may occur in particular embodiments. In other embodiments, additional operations may be performed by the components of the various systems described herein. Various embodiments of the present disclosure contemplate any suitable signaling mechanisms for accomplishing the functions described herein. Some of the operations illustrated in the FIGS. may be repeated, combined, modified or deleted where appropriate. Additionally, operations may be performed in any suitable order without departing from the scope of particular embodiments.

Numerous specific details are set forth herein, such as examples of specific types of processors and system configurations, specific hardware structures, and specific architectural and micro architectural details in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Any portion of the systems or components described herein may be included within a device capable of transmitting and/or receiving data. For example, any portion of system 100 may be included in a computing device, such as a host device or a peripheral device, either of which may include a processor, system-on-a-chip (SoC), or other suitable circuitry. A host device may comprise any suitable computing system operable to connect to peripheral devices and transmit data to and/or receive data from peripheral devices. A host device may comprise one or more processors and one or more ports. A host device may comprise or be coupled to any other suitable circuitry, such as memory, interconnect, one or more communication controllers, or other suitable circuitry. Peripheral devices may include any suitable device to communicate with a host device. For example, a peripheral device may be an input device such as a an image scanner, a video recorder, a microphone, a data acquisition device, or other suitable device that generally communicates data to the host device; an output device such as a monitor, projector, printer, or other suitable device that generally receives data from the host device; or a device such as a communication hub, hard disk drive, flash drive, memory card, or other suitable device to both send and receive data from the host device.

Although the embodiments herein may be described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from the features described herein. For example, the disclosed embodiments are not limited to particular host devices or peripheral devices, but may apply to any suitable host or peripheral devices such as desktop computer systems, server computer systems, handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatuses, methods, and systems described herein are not limited to physical computing devices, but may also relate to software optimizations.

Figure 9:
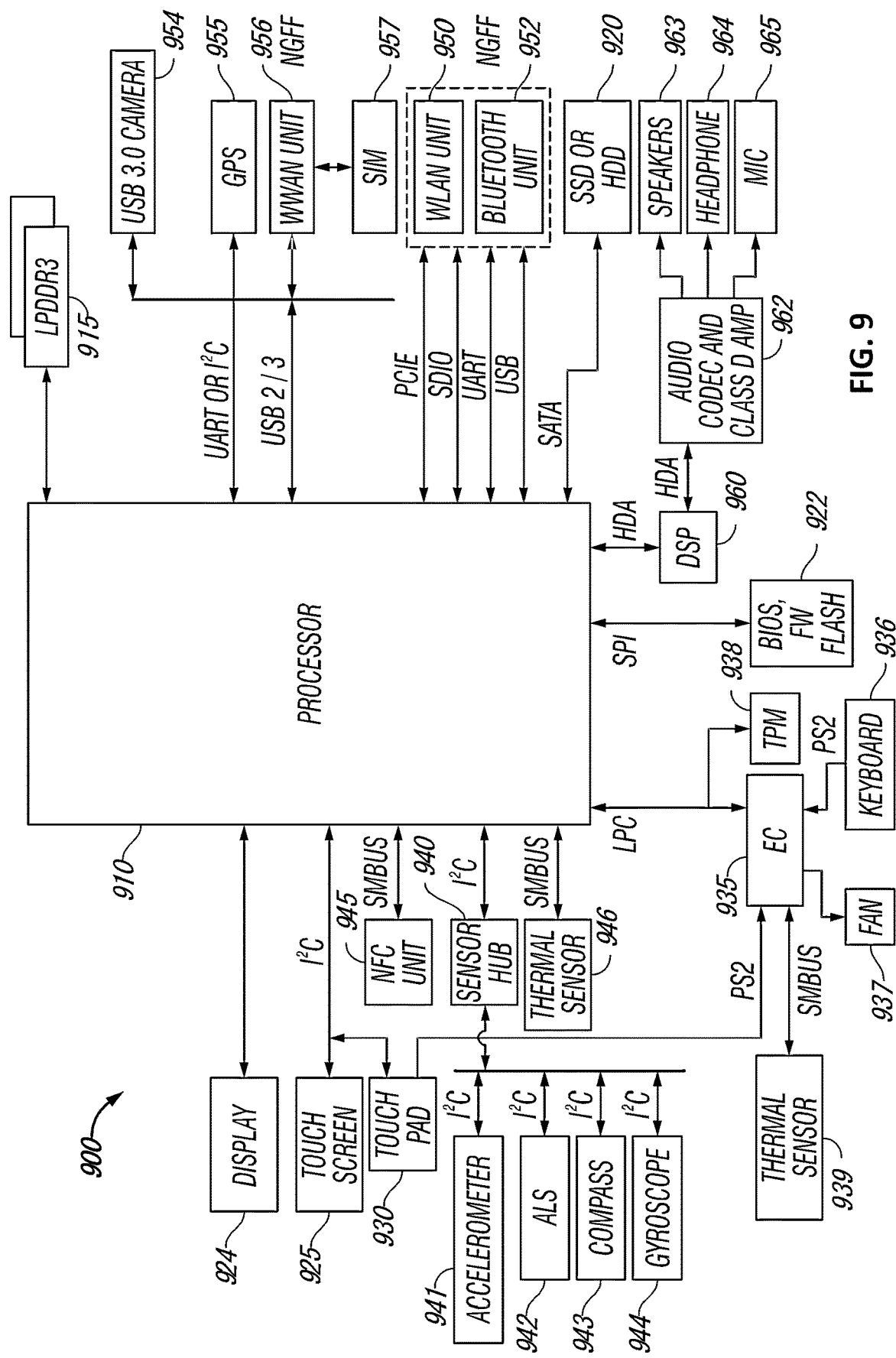
FIG. 9 illustrates a block diagram of components present in a computing system in accordance with various embodiments.
Figure 10:
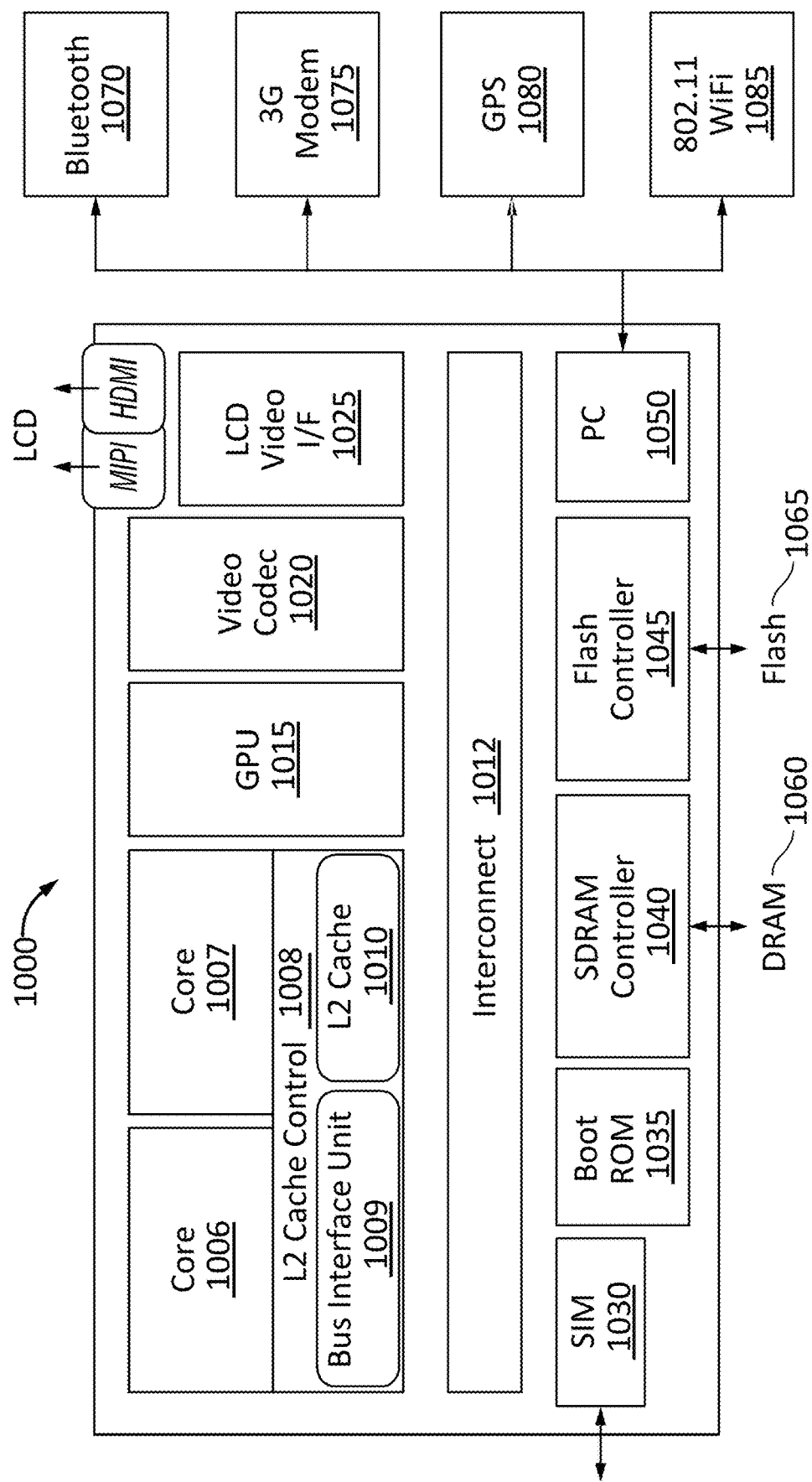
FIG. 10 illustrates a block diagram of another computing system in accordance with various embodiments.

FIGS. 9 and 10 depict example systems in which various embodiments described herein may be implemented. For example, any of the components depicted could implement a host 120, a device 116, an orchestration system 104, or enhanced retimer system 102.

Referring now to FIG. 9, a block diagram of components present in a computer system that may function as either a host device or a peripheral device (or which may include both a host device and one or more peripheral devices) in accordance with certain embodiments is described. As shown in FIG. 9, system 900 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 9 is intended to show a high level view of many components of the computer system. However, it is to be understood that some of the components shown may be omitted, additional components may be present, and different arrangement of the components shown may occur in other implementations. As a result, the disclosure described above may be implemented in any portion of one or more of the interconnects illustrated or described below.

As seen in FIG. 9, a processor 910, in one embodiment, includes a microprocessor, multi-core processor, multi-threaded processor, an ultra low voltage processor, an embedded processor, or other known processing element. In the illustrated implementation, processor 910 acts as a main processing unit and central hub for communication with many of the various components of the system 900. As one example, processor 910 is implemented as a system on a chip (SoC). As a specific illustrative example, processor 910 includes an Intel® Architecture Core™-based processor such as an i3, i5, i7 or another such processor available from Intel Corporation, Santa Clara, CA. However, other low power processors such as those available from Advanced Micro Devices, Inc. (AMD) of Sunnyvale, CA, a MIPS-based design from MIPS Technologies, Inc. of Sunnyvale, CA, an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitecture implementation may vary, but the architectural function of the processor is usually consistent. Certain details regarding the architecture and operation of processor 910 in one implementation will be discussed further below to provide an illustrative example.

Processor 910, in one embodiment, communicates with a system memory 915. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (QDP). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMNs, MiniDIMNs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 920 may also couple to processor 910. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 9, a flash device 922 may be coupled to processor 910, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 900. Specifically shown in the embodiment of FIG. 9 is a display 924 which may be a high definition LCD or LED panel configured within a lid portion of the chassis. This display panel may also provide for a touch screen 925, e.g., adapted externally over the display panel such that via a user's interaction with this touch screen, user inputs can be provided to the system to enable desired operations, e.g., with regard to the display of information, accessing of information and so forth. In one embodiment, display 924 may be coupled to processor 910 via a display interconnect that can be implemented as a high performance graphics interconnect. Touch screen 925 may be coupled to processor 910 via another interconnect, which in an embodiment can be an I2C interconnect. As further shown in FIG. 9, in addition to touch screen 925, user input by way of touch can also occur via a touch pad 930 which may be configured within the chassis and may also be coupled to the same I2C interconnect as touch screen 925.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080p), be compatible with an embedded display port (eDP), and be a low power panel with panel self refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 910 in different manners. Certain inertial and environmental sensors may couple to processor 910 through a sensor hub 940, e.g., via an I2C interconnect. In the embodiment shown in FIG. 9, these sensors may include an accelerometer 941, an ambient light sensor (ALS) 942, a compass 943 and a gyroscope 944. Other environmental sensors may include one or more thermal sensors 946 which in some embodiments couple to processor 910 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

Also seen in FIG. 9, various peripheral devices may couple to processor 910. In the embodiment shown, various components can be coupled through an embedded controller 935. Such components can include a keyboard 936 (e.g., coupled via a PS2 interface), a fan 937, and a thermal sensor 939. In some embodiments, touch pad 930 may also couple to EC 935 via a PS2 interface. In addition, a security processor such as a trusted platform module (TPM) 938 in accordance with the Trusted Computing Group (TCG) TPM Specification Version 1.2, dated Oct. 2, 2003, may also couple to processor 910 via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus (USB) Revision 3.2 Specification (September 2017), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 900 can communicate with external devices in a variety of manners, including wirelessly. In the embodiment shown in FIG. 9, various wireless modules, each of which can correspond to a radio configured for a particular wireless communication protocol, are present. One manner for wireless communication in a short range such as a near field may be via a near field communication (NFC) unit 945 which may communicate, in one embodiment with processor 910 via an SMBus. Note that via this NFC unit 945, devices in close proximity to each other can communicate. For example, a user can enable system 900 to communicate with another portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 9, additional wireless units can include other short range wireless engines including a WLAN unit 950 and a Bluetooth unit 952. Using WLAN unit 950, Wi-Fi™ communications in accordance with a given Institute of Electrical and Electronics Engineers (IEEE) 802.11 standard can be realized, while via Bluetooth unit 952, short range communications via a Bluetooth protocol can occur. These units may communicate with processor 910 via, e.g., a USB link or a universal asynchronous receiver transmitter (UART) link. Or these units may couple to processor 910 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 956 which in turn may couple to a subscriber identity module (SIM) 957. In addition, to enable receipt and use of location information, a GPS module 955 may also be present. Note that in the embodiment shown in FIG. 9, WWAN unit 956 and an integrated capture device such as a camera module 954 may communicate via a given USB protocol such as a USB 2.0 or 3.0 link, or a UART or I2C protocol. Again, the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multifunction device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 960, which may couple to processor 910 via a high definition audio (HDA) link. Similarly, DSP 960 may communicate with an integrated coder/decoder (CODEC) and amplifier 962 that in turn may couple to output speakers 963 which may be implemented within the chassis. Similarly, amplifier and CODEC 962 can be coupled to receive audio inputs from a microphone 965 which in an embodiment can be implemented via dual array microphones (such as a digital microphone array) to provide for high quality audio inputs to enable voice-activated control of various operations within the system. Note also that audio outputs can be provided from amplifier/CODEC 962 to a headphone jack 964. Although shown with these particular components in the embodiment of FIG. 9, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 910 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

Power control in the processor can lead to enhanced power savings. For example, power can be dynamically allocated between cores, individual cores can change frequency/voltage, and multiple deep low power states can be provided to enable very low power consumption. In addition, dynamic control of the cores or independent core portions can provide for reduced power consumption by powering off components when they are not being used.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TxT), and Intel® Manageability Engine Technology along with secure user interfaces such as a secure keyboard and display.

Turning next to FIG. 10, another block diagram for an example computing system that may serve as a host device or peripheral device (or may include both a host device and one or more peripheral devices) in accordance with certain embodiments is shown. As a specific illustrative example, SoC 1000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SoC 1000 includes 2 cores-1006 and 1007. Similar to the discussion above, cores 1006 and 1007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1006 and 1007 are coupled to cache control 1008 that is associated with bus interface unit 1009 and L2 cache 1010 to communicate with other parts of system 1000. Interconnect 1012 includes an on-chip interconnect, such as an IOSF, AMBA, or other interconnect discussed above, which potentially implements one or more aspects of the described disclosure.

Interconnect 1012 provides communication channels to the other components, such as a Subscriber Identity Module (SIM) 1030 to interface with a SIM card, a boot rom 1035 to hold boot code for execution by cores 1006 and 1007 to initialize and boot SoC 1000, a SDRAM controller 1040 to interface with external memory (e.g. DRAM 1060), a flash controller 1045 to interface with non-volatile memory (e.g. Flash 1065), a peripheral control 1050 (e.g. Serial Peripheral Interface) to interface with peripherals, video codecs 1020 and Video interface 1025 to display and receive input (e.g. touch enabled input), GPU 1015 to perform graphics related computations, etc. Any of these interfaces may incorporate aspects of the disclosure described herein.

In addition, the system illustrates peripherals for communication, such as a Bluetooth module 1070, 3G modem 1075, GPS 1080, and WiFi 1085. Note as stated above, a UE includes a radio for communication. As a result, these peripheral communication modules are not all required. However, in a UE some form of a radio for external communication is to be included.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any non-transitory mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; or other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Example 1 includes a system comprising a plurality of retimers to provide selective connectivity for links between a plurality of computing devices, wherein a retimer of the plurality of retimers comprises multiplexing circuitry to select an ingress lane from among a plurality of ingress lanes to couple to an egress lane; and retiming circuitry to retime a signal received on the selected ingress lane and transmit the retimed signal on the egress lane.

Example 2 includes the subject matter of Example 1, and wherein multiplexing circuitry of the plurality of retimers is configurable to enable partitioned links for a first computing device of the plurality of computing devices, wherein the first computing device is to be coupled to the plurality of retimers through a plurality of first lanes, and the plurality of retimers are to couple a first portion of the first lanes to a second computing device and a second portion of the first lanes to a third computing device.

Example 3 includes the subject matter of any of Examples 1 and 2, and wherein the retimer of the plurality of retimers further comprises a skew table to configure skew adjustment at a per-lane granularity.

Example 4 includes the subject matter of Example 3, and wherein the skew table comprises skew values for each possible egress lane to ingress lane combination of the retimer.

Example 5 includes the subject matter of any of Examples 1-4, and wherein the plurality of retimers comprises a first layer of retimers and a second layer of retimers between connected computing devices of the plurality of computing devices.

Example 6 includes the subject matter of Example 5, and wherein a connectivity granularity of lanes between the first layer and the second layer is different from a connectivity granularity of lanes between the second layer and a subset of the plurality of computing devices.

Example 7 includes the subject matter of any of Examples 1-6, and wherein each retimer of the plurality of retimers is to couple to a different lane of a first computing device of the plurality of computing devices.

Example 8 includes the subject matter of any of Examples 1-7, and further including an orchestration system comprising a processor, the orchestration system to communicate with the plurality of retimers to configure multiplexing circuitry of each of the plurality of retimers.

Example 9 includes the subject matter of Example 8, and wherein the orchestration system is to initiate a hot plug flow to establish a link between two of the computing devices.

Example 10 includes the subject matter of Example 9, and wherein the plurality of retimers are to bypass equalization on lanes of the link during establishment of the link.

Example 11 includes the subject matter of any of Examples 1-10, and further including the computing devices.

Example 12 includes the subject matter of any of Examples 1-11, and wherein the selective connectivity comprises host-to-host connectivity.

Example 13 includes the subject matter of any of Examples 1-12, and wherein the selective connectivity comprises device-to-device connectivity.

Example 14 includes the subject matter of any of Examples 1-13, and wherein the selective connectivity comprises host-to-device connectivity.

Example 15 includes an apparatus comprising multiplexing circuitry to select an ingress lane from among a plurality of ingress lanes to couple to an egress lane; and retiming circuitry to retime a signal received on the selected ingress lane and transmit the retimed signal on the egress lane.

Example 16 includes the subject matter of Example 15, and wherein the multiplexing circuitry in combination with multiplexing circuitry of a plurality of retimers is configurable to enable partitioned links for a first computing device of a plurality of computing devices, wherein the first computing device is to be coupled to the plurality of retimers through a plurality of first lanes, and the plurality of retimers are to couple a first portion of the first lanes to a second computing device and a second portion of the first lanes to a third computing device.

Example 17 includes the subject matter of any of Examples 15 and 16, and further comprising a skew table to configure skew adjustment at a per-lane granularity.

Example 18 includes the subject matter of any of Examples 15-17, and wherein the skew table comprises skew values for each possible egress lane to ingress lane combination of a retimer.

Example 19 includes the subject matter of any of Examples 15-18, and further comprising a plurality of retimers comprising a first layer of retimers and a second layer of retimers between connected computing devices of a plurality of computing devices.

Example 20 includes the subject matter of any of Example 19, and wherein a connectivity granularity of lanes between the first layer and the second layer is different from a connectivity granularity of lanes between the second layer and a subset of the plurality of computing devices.

Example 21 includes the subject matter of any of Examples 15-20, further comprising a plurality of retimers, and wherein each retimer of the plurality of retimers is to couple to a different lane of a first computing device of a plurality of computing devices.

Example 22 includes the subject matter of any of Examples 15-21, and further including an orchestration system comprising a processor, the orchestration system to communicate with a plurality of retimers to configure multiplexing circuitry of each of the plurality of retimers.

Example 23 includes the subject matter of Example 22, and wherein the orchestration system is to initiate a hot plug flow to establish a link between two of the computing devices.

Example 24 includes the subject matter of any of Examples 15-23, and further comprising port circuitry to bypass equalization on lanes of a link during establishment of the link.

Example 25 includes the subject matter of any of Examples 15-24, and further including a plurality of computing devices.

Example 26 includes the subject matter of any of Examples 15-25, and wherein the retimed signal is sent over a host-to-host link.

Example 27 includes the subject matter of any of Examples 15-26, and wherein the retimed signal is sent over a device-to-device link.

Example 28 includes the subject matter of any of Examples 15-27, and wherein the retimed signal is sent over a host-to-device link.

Example 29 includes a method comprising selecting, using multiplexing circuitry, an ingress lane from among a plurality of ingress lanes to couple to an egress lane; and retiming a signal received on the selected ingress lane; and transmitting the retimed signal on the egress lane.

Example 30 includes the subject matter of Example 29, and further comprising enabling, by multiplexing circuitry of a plurality of retimers, partitioned links for a first computing device of a plurality of computing devices, wherein the first computing device is to be coupled to the plurality of retimers through a plurality of first lanes, and the plurality of retimers are to couple a first portion of the first lanes to a second computing device and a second portion of the first lanes to a third computing device.

Example 31 includes the subject matter of any of Examples 29 and 30, and further comprising utilizing a skew table to configure skew adjustment at a per-lane granularity.

Example 32 includes the subject matter of Example 31, and wherein the skew table comprises skew values for each possible egress lane to ingress lane combination of a retimer.

Example 33 includes the subject matter of any of Examples 29-32, and further comprising connecting links between a plurality of computing devices through a first layer of retimers and a second layer of retimers.

Example 34 includes the subject matter of Example 33, and wherein a connectivity granularity of lanes between the first layer and the second layer is different from a connectivity granularity of lanes between the second layer and a subset of the plurality of computing devices.

Example 35 includes the subject matter of any of Examples 29-34, and further comprising coupling each retimer of a plurality of retimers to a different lane of a first computing device of a plurality of computing devices.

Example 36 includes the subject matter of any of Examples 29-35, and further comprising, communicating, by an orchestration system, with a plurality of retimers to configure multiplexing circuitry of each of the plurality of retimers.

Example 37 includes the subject matter of Example 36, and wherein the orchestration system is to initiate a hot plug flow to establish a link between two computing devices.

Example 38 includes the subject matter of any of Examples 29-37, further comprising bypassing equalization on lanes of a link comprising the selected ingress lane and the egress lane during establishment of the link.

Example 39 includes the subject matter of any of Examples 29-39, and wherein the selective connectivity comprises host-to-host connectivity.

Example 40 includes the subject matter of any of Examples 29-40, and wherein the selective connectivity comprises device-to-device connectivity.

Example 41 includes the subject matter of any of Examples 29-41, and wherein the selective connectivity comprises host-to-device connectivity.

Example 42 includes at least one non-transitory machine accessible storage medium having instructions stored thereon, the instructions when executed on a machine, cause the machine to perform the method of any of Examples 29-41.

Example 43 includes a system comprising means to perform the method of any of Examples 29-41.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a retimer comprising:
      retimer circuitry to forward data received on ingress lanes to egress lanes;
      a plurality of ingress lanes;
      a plurality of egress lanes;
      multiplexer circuitry, wherein the multiplexer circuitry implements a respective multiplexer at each of the plurality of egress lanes, and each of the multiplexers at the egress lanes couple to the plurality of ingress lanes; and
      a system management port to receive a control signal, wherein the control signal comprises connection settings to identify which ingress lanes in the plurality of ingress lanes are to be connected to which egress lanes in the plurality of egress lanes, wherein the control signal causes the multiplexer circuitry to couple the plurality of ingress lanes to the plurality of egress lanes based on the connection settings.

2. The apparatus of claim 1, wherein the retimer is to couple to a first plurality of devices on the plurality of egress lanes.

3. The apparatus of claim 2, wherein the retimer is to couple to a second plurality of devices on the plurality of devices on the plurality of ingress lanes, wherein the connection settings enable connections between the first plurality of devices and the second plurality of devices over the retimer using the plurality of ingress lanes and the plurality of egress lanes.

4. The apparatus of claim 1, wherein the retimer further comprises an independent per-lane retimer state machine (RTSM) for each of the plurality of egress lanes.

5. The apparatus of claim 4, wherein each of the per-lane RTSMs is to implement at least a portion of a link training and status state machine (LTSSM) of link protocol.

6. The apparatus of claim 5, wherein the link protocol comprises a Peripheral Component Interconnect Express (PCIe)-based protocol.

7. The apparatus of claim 5, wherein the link protocol comprises a Compute Express Link (CXL)-based protocol.

8. The apparatus of claim 5, wherein the retimer is further to support a bypass equalization feature defined in the link protocol.

9. The apparatus of claim 1, wherein the control signal is received from system software.

10. The apparatus of claim 1, wherein the control signal is received based on a hot swap event.

11. The apparatus of claim 1, wherein a first subset of the plurality of ingress lanes are to be coupled to a first subset of the egress lanes by the multiplexer circuitry based on the control signal, a second subset of the plurality of ingress lanes are to be coupled to a second subset of the egress lanes by the multiplexer circuitry based on the control signal, the first subset of ingress lanes and the first subset of egress lanes comprise lanes of a first link, and the second subset of ingress lanes and the second subset of egress lanes comprise lanes of a second link, wherein the first link and the second link function independently.

12. The apparatus of claim 1, wherein the control signal indicates that the plurality of ingress lanes are to couple to the plurality of egress lanes as part of a single particular link, wherein the particular link connects a first device to a second device and the retimer is positioned between the first device and the second device on the particular link to extend a physical length of the particular link.

13. The apparatus of claim 1, wherein the retimer further implements, for each of the ingress lanes, a respective register to store data identifying a skew value for the corresponding ingress lane.

14. A method comprising:
receiving a control signal at a retimer, wherein the retimer is positioned on a set of links, the set of links are to couple a first set of devices to a second set of devices, and the retimer is positioned between the first set of devices and the second set of devices on the set of links, wherein the retimer comprises a plurality of ingress lanes, a plurality of egress lanes, and multiplexer circuitry to selectively couple the plurality of ingress lanes to the plurality of egress lanes; and
changing a coupling of the plurality of ingress lanes to the plurality of egress lanes using the multiplexer circuitry based on the control signal, wherein the control signal is based on the set of links.

15. The method of claim 14, wherein the set of links comprise a single link, the first set of devices comprises a single first device, and the second set of devices comprise a single second device.

16. The method of claim 14, wherein the set of links comprise a plurality of links, the first set of devices comprise a first device and a second device, and the second set of devices comprise a third device and a fourth device, wherein a first one of the plurality of links is to couple the first device to the third device, and a second one of the plurality of links is to couple the second device to the fourth device.

17. A system comprising:
a first plurality of devices;
a second plurality of devices, wherein a plurality of links couple the first plurality of devices to the second plurality of devices; and
a retimer device positioned between the first plurality of devices and the second plurality of devices on the plurality of links, wherein the retimer comprises:
retimer circuitry to forward data received on ingress lanes to egress lanes;
a plurality of ingress lanes, wherein a first subset of the plurality of ingress lanes are coupled to a first one of the first plurality of devices and a second subset of the plurality of ingress lanes are coupled to a second one of the first plurality of devices;
a plurality of egress lanes, wherein a first subset of the plurality of egress lanes are coupled to a first one of the second plurality of devices and a second subset of the plurality of egress lanes are coupled to a second one of the second plurality of devices;
multiplexer circuitry, to selectively couple the plurality of ingress lanes to the plurality of egress lanes; and
a system management port to receive a control signal, wherein the control signal comprises connection settings to identify how to selectively couple the plurality of ingress lanes to the plurality of egress lanes, wherein the multiplexer circuitry is to selectively couple the plurality of ingress lanes to the plurality of egress lanes based on the connection settings in the control signal.

18. The system of claim 17, wherein the first plurality of devices comprise a plurality of processor devices.

19. The system of claim 18, wherein the second plurality of device comprise at least one of a plurality of memory devices to implement a shared memory pool or an accelerator device.

20. The system of claim 17, further comprising a second retimer device, wherein the second retimer device is also positioned between the first plurality of devices and the second plurality of devices on the plurality of links, and a first device in the first plurality of devices and a second device in the second plurality of devices are coupled by a particular one of the plurality of links, one or more lanes of the particular link pass through the retimer device and one or more other lanes of the particular link pass through the other retimer device.

* * * * *